United States Patent
Croft

(10) Patent No.: US 6,493,670 B1
(45) Date of Patent: Dec. 10, 2002

(54) METHOD AND APPARATUS FOR TRANSMITTING DTMF SIGNALS EMPLOYING LOCAL SPEECH RECOGNITION

(75) Inventor: Thomas M. Croft, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/418,528

(22) Filed: Oct. 14, 1999

(51) Int. Cl.[7] .......................... G10L 15/04; H04Q 7/20; H04M 1/64
(52) U.S. Cl. .................... 704/270; 704/251; 379/88.01; 379/88.03; 455/563
(58) Field of Search ................................. 704/251, 231, 704/257, 270; 379/88.01, 88.02, 88.03, 563, 204.01, 205.01, 207.01; 455/460, 550, 564

(56) References Cited

U.S. PATENT DOCUMENTS 5,402,477 A    3/1995   McMahan et al. .......... 379/201
6,212,408 B1 *  4/2001   Son et al. .............. 379/355.01

FOREIGN PATENT DOCUMENTS

| EP | 0311414 A2 | 4/1989 |
| EP | 0568979 A1 | 11/1993 |
| EP | 0692902 A1 | 1/1996 |
| EP | 0893901 A2 | 1/1999 |
| WO | 9712361    | 4/1997 |

\* cited by examiner

Primary Examiner—David D. Knepper
Assistant Examiner—Abul K. Azad
(74) Attorney, Agent, or Firm—Coats & Bennett, P.L.L.C.

(57) ABSTRACT

A method and apparatus providing a telephone user with a manner in which to send DTMF commands during a call over a communication network by use of a speech-based user interface. The user speaks one or more words corresponding to DTMF commands, and the invention performs speech recognition on the spoken words, generates corresponding DTMF signals, and transmits the DTMF signals over the network.

18 Claims, 5 Drawing Sheets

METHOD AND APPARATUS FOR TRANSMITTING DTMF SIGNALS EMPLOYING LOCAL SPEECH RECOGNITION

FIELD OF THE INVENTION

The present invention relates generally to the field of telecommunications and more particularly to a method and apparatus for transmitting Dual Tone Multi-frequency (DTMF) signals to an automated system responsive to touch-tone control thereof by using a speech-based user interface.

BACKGROUND OF THE INVENTION

The use of automated DTMF (i.e., touch-tone) controlled systems is now common throughout much of the industrialized world and still increasing. Such systems are employed for a variety of reasons, including to provide greater convenience to users (e.g., automated after hours services) and to reduce the need for human telephone operators. For example, some mail order companies with limited customer service hours use an automated after-hours system that allows a customer to check on the status of an order 24 hours a day. The customer navigates the automated system by pressing keys on the phone keypad to send DTMF commands in response to a recorded menu of options. However, many telephones of both traditional wireline and the wireless variety (i.e., cordless, cellular, PCS, or satellite) provide the keypad within the handset, thereby making it very inconvenient for the user to send DTMF commands while listening for responses from the automated system. To press a key, the user has to remove the phone from his or her ear to look at the keypad and then return the phone to the ear again to hear the next prompt. During a call in which a number of such commands must be sent to an automated system the user must repeat this back and forth motion frequently.

Advances in speech recognition technology over the years have made possible some improvements in the way users submit commands to automated DTMF-controlled systems. For example, some automated DTMF-controlled systems themselves allow the user to speak commands instead of pressing keys on the keypad. In such systems, the user is told, "Press or say '9'," for example. Another approach is to provide an intermediate server in the network between the user and the automated response system to convert spoken commands to DTMF signals, which are then relayed to the automated response system. One disadvantage of this approach, however, is that the user must first call the intermediate server, which in turn calls the desired automated DTMF-controlled system. Sometimes the user does not know a priori whether or not a commercial entity has an automated DTMF-controlled system. Also, users may not want to go through the extra time and steps of dialing an intermediate speech-to-DTMF server.

Another manner in which speech recognition technology is used to facilitate the sending of DTMF commands is in voice dialing, a method in which a user may dial a telephone number by speaking the number instead of pressing keys on a keypad. In some implementations this capability even extends to simple spoken labels that represent a number such as "home" to represent user's home telephone number. This capability may be implemented in either the local terminal or in the network. Once dialing is complete, however, the speech recognition function is turned off, and the speech-to-DTMF capability is not available to the user during a call for use with automated systems responsive to touch-tone control.

SUMMARY OF THE INVENTION

It is a first object of the present invention, therefore, to provide a speech-based user interface for transmitting DTMF signals during a telephone call to automated systems that can be controlled by DTMF signals. A second object of the invention is to provide such a speech-based user interface without requiring the user to have a priori knowledge of the automated DTMF-controlled system and without the user having to access an intermediate server in the network to access the speech-to-DTMF conversion capability. A third object is to provide the user with simple control over the speech recognition aspect of the invention. Finally, it is an object of the present invention to provide the user with the capability of transmitting multiple DTMF commands with a single activation of the speech recognition circuit.

The invention satisfies these objects by providing a telephone apparatus and associated method. The apparatus comprises a microphone for receiving spoken utterances from a user, a speech recognition circuit, and a DTMF signal generator. When the user speaks an utterance corresponding to a DTMF command that the user wants to transmit over a communication network, the speech recognition circuit analyzes the spoken utterance to determine whether or not it matches one of a predetermined set of DTMF commands. If so, the DTMF signal generator outputs the corresponding DTMF signal for transmission over the communication network.

In a further embodiment of the present invention, the speech recognition circuit is activated by a push button switch located on the telephone. In another alternative embodiment, the speech recognition circuit responds to a predetermined activation utterance from the user by activating the conversion and transmission of spoken DTMF commands. In yet another embodiment, the user receives confirmation of recognized words via speech synthesis and has the opportunity to cancel the transmission of an incorrect DTMF command.

These and other objects of the invention, together with features and advantages therefore, will become apparent from the following detailed specification when read with the accompanying drawings in which like reference numerals refer to like elements.

BRIEF DESCRIPTION OF THE DRAWINGS

For a more complete understanding of the present invention, reference is made to the following Detailed Description taken in conjunction with the accompanying drawings, wherein.

DETAILED DESCRIPTION OF THE INVENTION

Figure 1:
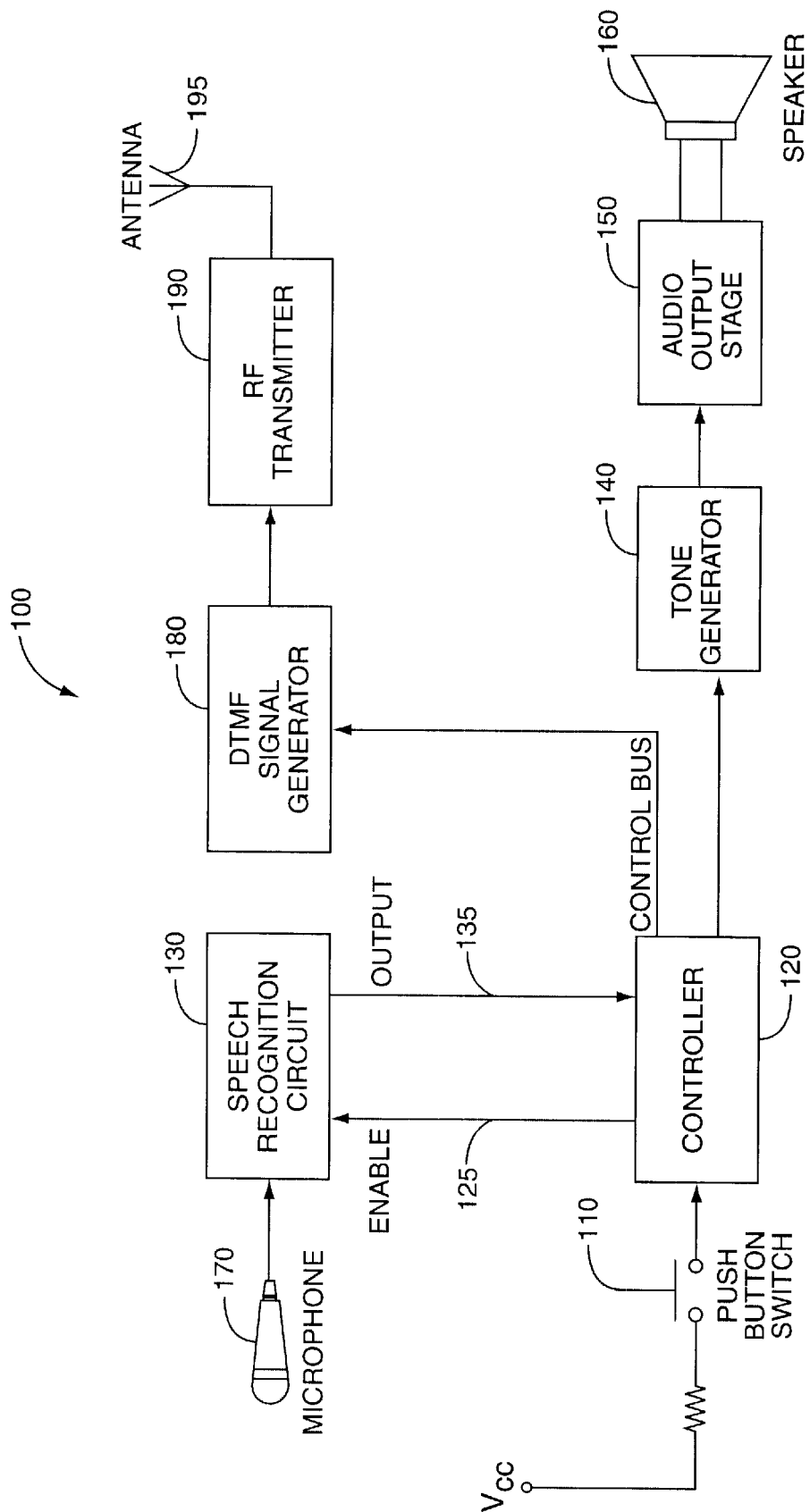
FIG. 1 is a simplified circuit block diagram of one embodiment of the present invention.

Referring to the drawings, FIG. 1 shows a simplified circuit block diagram of an embodiment of the invention. In this embodiment, the invention resides in a communication device such as a cellular telephone, satellite phone, cordless phone, personal digital assistant (PDA), palmtop computer, or laptop computer equipped with a wireless modem, collectively referred hereafter as a "telephone" 100. The telephone 100 includes a push button switch 110 conveniently located so the user may press it while holding the telephone 100 to his or her ear. When a user presses push button switch 110 momentarily, controller 120 asserts enable line 125 to enable a speech recognition circuit 130. Also, the controller 120 activates a tone generator 140. The output of tone generator 140 is fed to an audio output stage 150, which in turn drives a speaker 160. The audible tone is used to signal the user that the speech recognition circuit 130 is ready to accept spoken utterances. Other audible tones of the same or different frequency may be used at other times to signal that word recognition has failed or that the recognition and transmission of a DTMF command was successful.

The speech recognition circuit 130 receives the user's spoken utterances which have been converted to electrical form by microphone 170. The output 135 of the speech recognition circuit 130 is fed to the controller 120. If the speech recognition circuit 130 reports that an utterance spoken by the user corresponds to a DTMF command, the controller 120 uses control bus 122 to cause the DTMF signal generator 180 to generate the associated DTMF signal, which is transmitted by RF transmitter 190 over a wireless communication network via antenna 195.

The speech recognition circuit 130 is preferably of the type that does not require prior training to recognize utterances spoken by a particular individual. The speech recognition circuit is also adapted to recognize a small input vocabulary of spoken utterances comprising word names corresponding to the digits "0" through "9", "#", "*", and the word names of the letters "A" through "Z". For example, a vocabulary such as "one," "two," "three," "four," "five," "six," "seven," "eight," "nine," "star," "asterisk," "pound," "number," and "A" through "Z" is sufficient for most applications involving DTMF commands.

In an alternative embodiment, the telephone 100 does not include push button switch 110. Instead, the speech recognition circuit 130 responds to a predetermined activation utterance from the user to prepare the speech recognition circuit 130 to receive a spoken utterance corresponding to one of the predetermined set of DTMF commands. In this embodiment, the user might speak, for example, a unique and perhaps unusual word or sound such as "shazam," then "five" to send a DTMF command for the digit "5" over the network.

Figure 2:
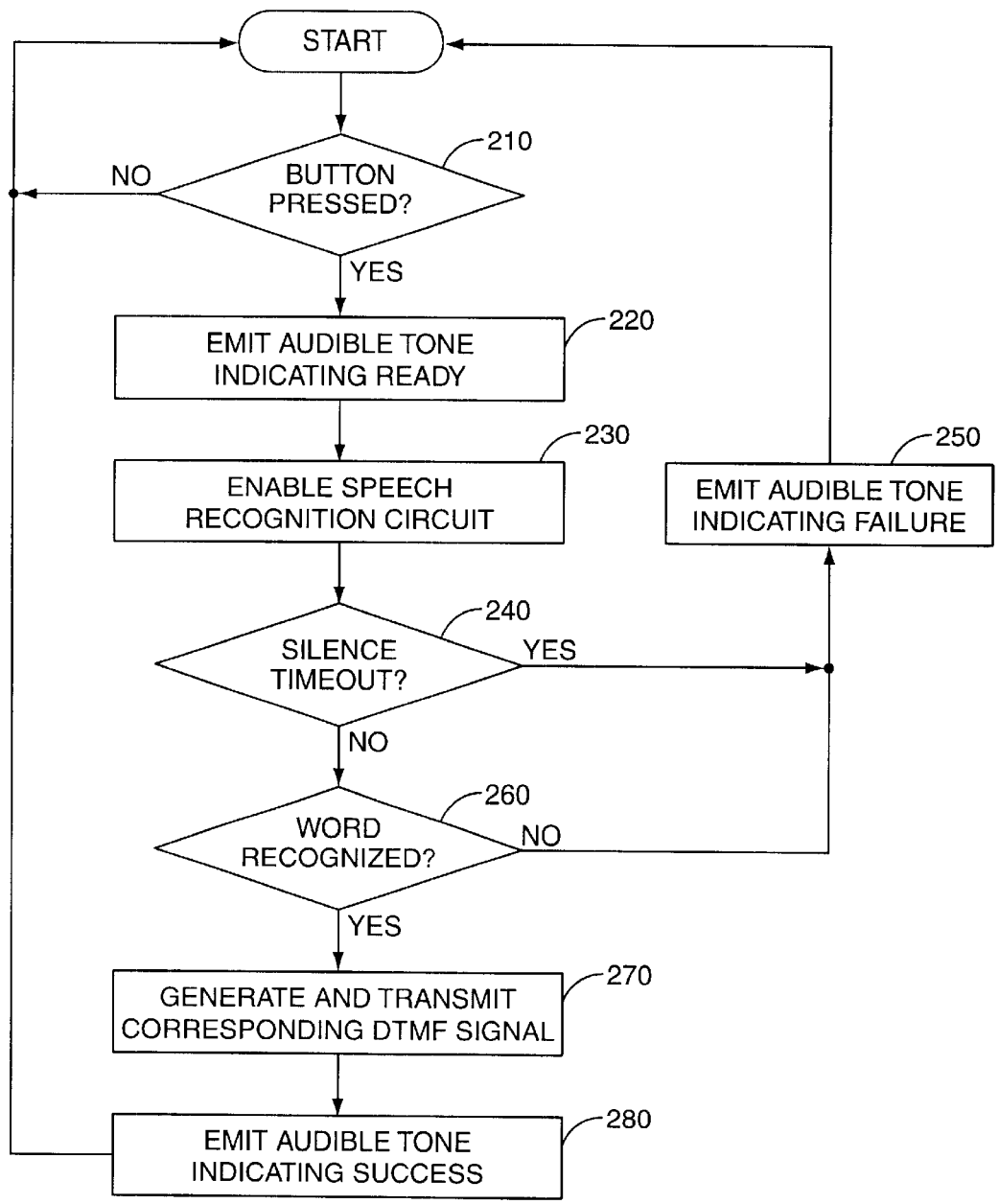
FIG. 2 is a flowchart illustrating the operation of the circuit block diagram shown in FIG. 1.

The operation of the simplified circuit block diagram of FIG. 1 is illustrated in FIG. 2. This method corresponds to the apparatus in FIG. 1. Referring to FIGS. 1 and 2, the process begins at inquiry step 210, in which the user's press of the push button switch 110 is awaited. Once push button switch 110 is pressed, an audible tone (e.g., a beep) is emitted through the telephone speaker at step 220 to indicate to the user that the speech recognition circuit 130 is ready to accept user input, and the speech recognition circuit 130 is enabled at step 230. At this point, a timing loop 240 measures the interval from when the speech recognizer 130 was enabled until a spoken utterance is received from the user over microphone 170. If no spoken utterance is received within a predetermined period, a silence timeout occurs, and processing proceeds to step 250, in which a distinct audible tone is emitted indicating that no spoken word was recognized and that the speech recognition circuit 130 has been disabled. If the user speaks a sound prior to the timing loop 240 registering a silence timeout, the speech recognition circuit 130 processes electrical input from microphone 170 at step 260 to identify the spoken word. If the spoken utterance is not recognized as belonging to the defined vocabulary (digits "0" through "9", "#", "*", or one of the alphabetic characters "A" through "Z", for example), processing proceeds to step 250 described above. If the spoken utterance is recognized as a valid command at inquiry step 260, the corresponding DTMF signal is generated and transmitted in step 270. Finally, at step 280, an audible tone is again emitted to inform the user that speech-to-DTMF conversion was successful.

Figure 3:
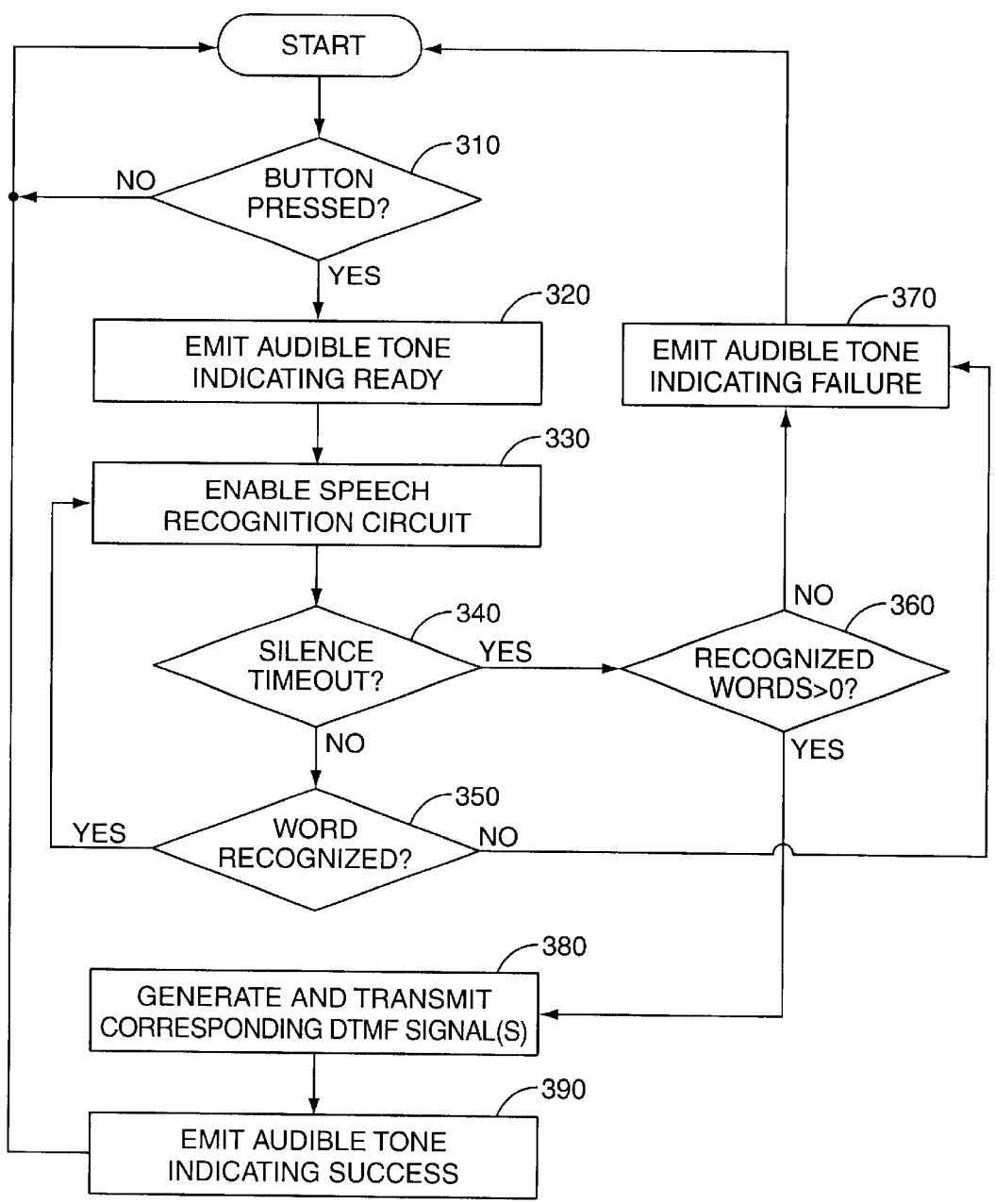
FIG. 3 is a flowchart illustrating an alternative operation of the circuit block diagram shown in FIG. 1.

In an alternative embodiment, the invention is capable of handling multiple DTMF commands with only a single activation step from the user. The method of this embodiment may be practiced using the apparatus of FIG. 1 with minor modifications in the operations carried out by controller 120. Referring to FIGS. 1 and 3, the process is initiated at inquiry step 310 by the user pressing the push button 110. An audible tone is output to the user at step 320 to indicate the speech recognition circuit 130 is ready to receive input, and the speech recognition circuit 130 is enabled at step 330. If the user speaks an utterance before timing loop 340 measures a period of silence exceeding a predetermined silence threshold, the identified word is queued in step 350, and processing returns to step 330 in which the speech recognizer is enabled for the recognition of a new spoken utterance. Processing continues in this looping manner from steps 330 through 350 until timeout loop 340 measures an interval of silence greater exceeding a predetermined duration. Thus, the user can send a DTMF command such as "157" in one step by use of this method. The user presses the push button switch 110, listens for the audible tone, speaks the digits "1", "3", and "7", each separated by a brief period of silence, and pauses after the last digit until the silence timeout occurs.

Once the timing loop 340 has measured a silence timeout, the controller 120 checks to determine whether at least one valid DTMF command word was recognized at inquiry step 360. If not, a distinct beep is output to the user at step 370 indicating failure. Step 370 is also executed if a spoken utterance from the user does not match the defined vocabulary of speech recognition circuit 130. If one or more valid words corresponding to DTMF commands were recognized, the corresponding DTMF command or commands are generated and transmitted over the network at step 380. Finally, an audible beep is again output to the user at step 390 to inform the user that speech-to-DTMF conversion was successful. In an alternative implementation of this embodiment, each individual DTMF command in a set of multiple DTMF commands is generated and sent immediately rather than being queued until all DTMF commands have been received.

The embodiment providing for multiple DTMF commands with a single activation of the speech recognition circuit 130 (see FIG. 3) may also be combined with the embodiment described above in which an activation utterance from the user alerts the speech recognizer 130 to expect DTMF command input in the next spoken utterance from the user. In this case, the speech recognition circuit 130 responds to a specific, predetermined activation utterance to signify that the next spoken utterance from the user will correspond to a DTMF command, as described above.

Figure 4:
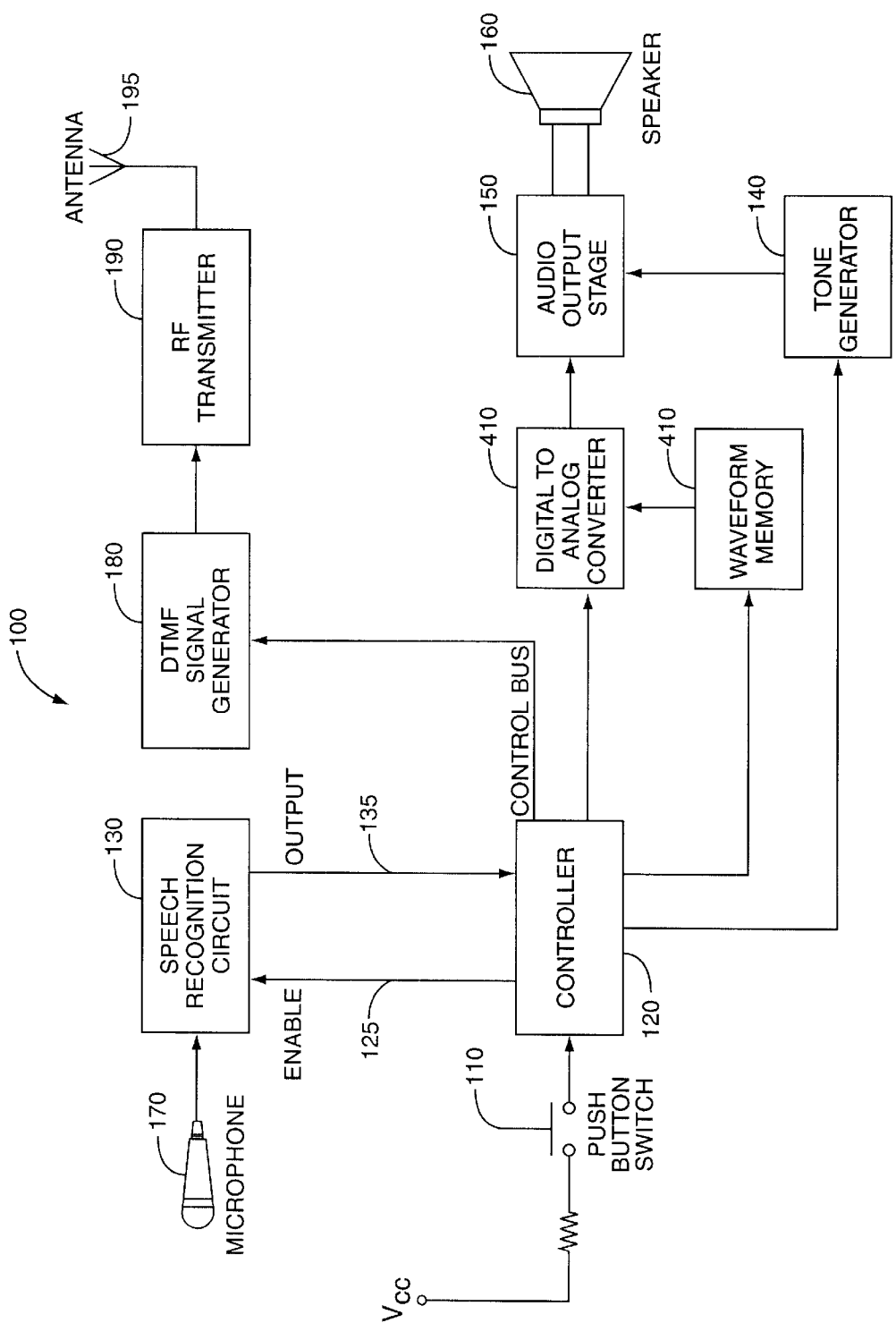
FIG. 4 is a simplified circuit block diagram of another embodiment of the present invention.

An alternative embodiment of the telephone 100 is shown in the simplified circuit block diagram of FIG. 4. This embodiment is similar to that of FIG. 1, except that this embodiment further includes a simple speech synthesizer comprising a digital-to-analog converter (D/A) 410 connected to a waveform memory 420. When the user speaks an utterance that the user desires to transmit as a DTMF command, a speech waveform corresponding to the spoken word recognized by the speech recognition circuit 130 is played from the waveform memory 420 through digital-to-analog converter 410 to the user through speaker 160. This confirms to the user that the recognized word is the one intended. If not, the user has the option of canceling the transmission, either by pressing push button switch 110 again within a predetermined period or not pressing it within a predetermined period, depending on the implementation of this feature.

Figure 5:
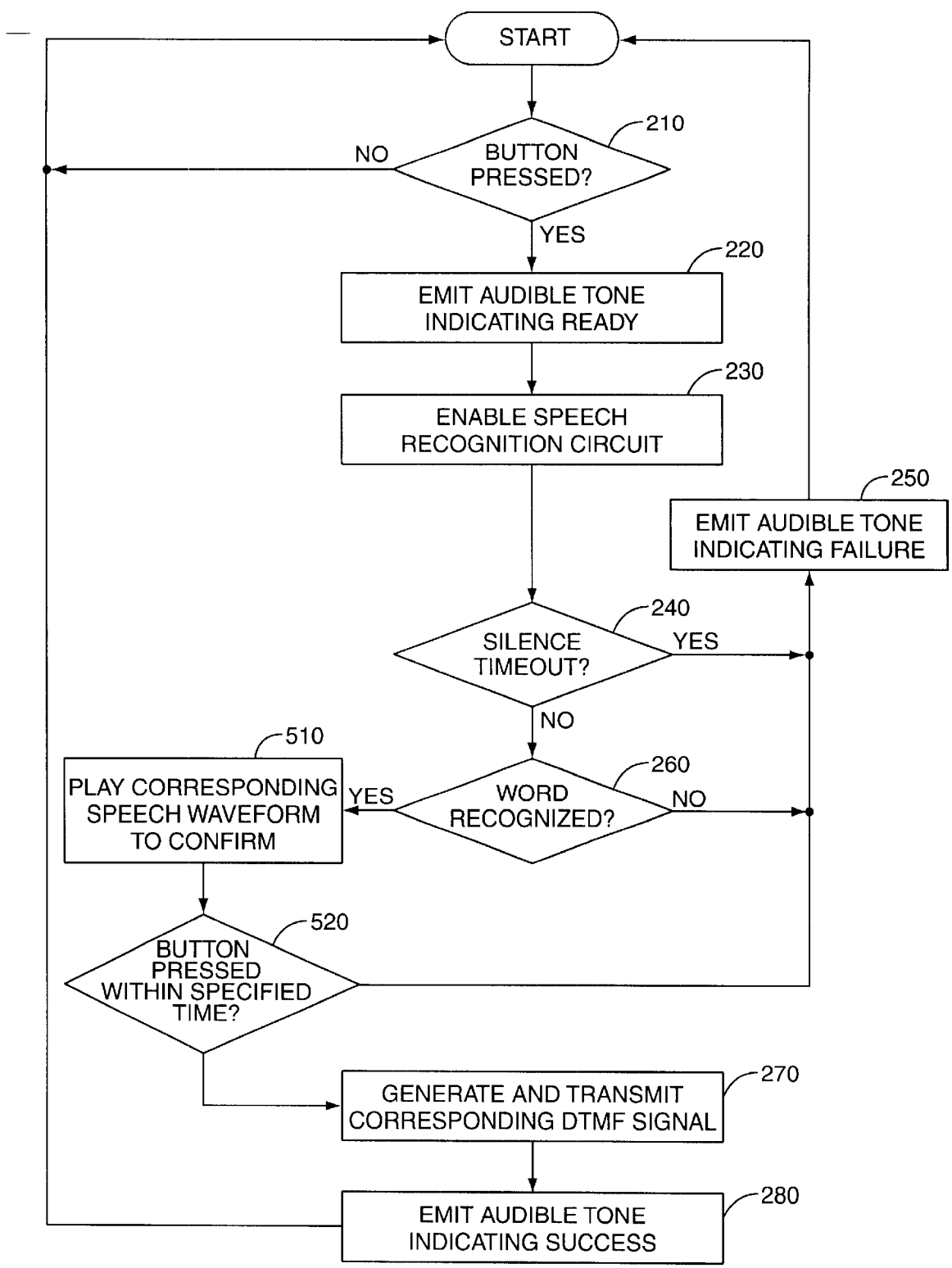
FIG. 5 is a flowchart illustrating the operation of the circuit block diagram shown in FIG. 4.

FIG. 5 is a flowchart of the operation of the simplified circuit block diagram shown in FIG. 4. This embodiment is especially useful when reliability is essential, such as banking transactions, in which an incorrect command sent from the user could have serious and undesirable consequences. The operation of this embodiment corresponds closely to that of FIG. 2, except that a speech waveform corresponding to the spoken word recognized by the speech recognition circuit 130 is played to the user from waveform memory 420 through digital-to-analog converter 410 through speaker 160 in step 510 of FIG. 5. In the preferred form of this embodiment, the user must press push button switch 110 again within a predetermined period (e.g., one second) to confirm the correctness of the speech recognition and authorize transmission of the DTMF signal (see step 520).

Alternatively, the user can press push button switch 110 again to cancel transmission. In this case, the command is considered confirmed automatically if the user does nothing within the predetermined period.

Another alternative implementation of the confirmation step is for speech recognition circuit 130 to respond to a predetermined confirmation utterance spoken by the user. This implementation is consistent with the embodiment described above in which a predetermined activation utterance prepares the speech recognizer circuit 130 to receive spoken utterances corresponding to DTMF commands. For example, a user might speak "shazam" to activate the speech recognition circuit 130, then "seven" to send a "7" as a DTMF command. When the speech synthesizer plays back the recognized utterance "seven," the user then says "okay" to confirm the transmission of the corresponding DTMF signal.

The embodiment illustrated in FIGS. 4 and 5 may also be combined with the alternative method of FIG. 3 to provide for the transmission of multiple DTMF commands with a single activation of speech recognition circuit 130. In this case, confirmation via speech synthesis is preferably delayed until all spoken commands have been recognized. In other words, all recognized digits are played back to the user in succession after all input spoken utterances have been recognized rather than immediately upon recognition of each individual utterance.

While the present invention has been described with respect to a few preferred embodiments, it will be appreciated by those of ordinary skill in the art that the present invention can be embodied in other specific forms without departing from the spirit or essential character thereof. The presently disclosed embodiments are therefore considered in all respects to be illustrative and not restrictive.

What is claimed is:

1. A telephone for use by a user who speaks an utterance which is indicative of a DTMF signal the user desires to be transmitted by the telephone, the telephone comprising:

a microphone which receives the spoken utterance from the user and outputs electrical microphone signals which are indicative of the spoken utterance;

a speech recognition circuit within said telephone which receives the electrical microphone signals and outputs a speech recognition signal which identifies when the microphone signals correspond to one of a predetermined set of DTMF commands;

an input for activating the speech recognition circuit while engaged in a call;

a DTMF signal generator which receives the speech recognition signal and responds, when the speech recognition signal identifies one of the predetermined set of DTMF commands, by outputting a DTMF signal which corresponds to the identified one of the predetermined set of DTMF commands; and means for deactivating the speech recognition circuit while engaged in a call.

2. The telephone of claim 1, wherein the input for activating the speech recognition circuit comprises a push-button switch which, when toggled by the user prior to the user speaking the utterance, activates the speech recognition circuit.

3. The telephone of claim 1, wherein the speech recognition circuit first waits for a microphone signal which corresponds to a predetermined activation command before outputting speech recognition signals indicative of a DTMF command.

4. The telephone of claim 1, wherein the means for deactivating the speech recognition circuit comprise a timer which waits for a predetermined period of silence after the user speaks one or more utterances indicative of one or more corresponding DTMF signals and deactivates the speech recognition circuit.

5. The telephone of claim 1, further comprising:
one or more speakers;
an audio output stage which drives the speakers;
a memory which stores speech waveforms corresponding to spoken names of the predetermined set of DTMF commands;
a speech synthesizer electrically connected to the audio output stage and the memory which reads the speech waveforms stored in the memory and plays to the user the spoken name corresponding to the DTMF signal recognized by the speech recognition circuit to provide the user with audible feedback.

6. The telephone of claim 1, further comprising:
an RF transmitter for transmitting the DTMF signal over a wireless communication network.

7. Within a telephone, a method for converting spoken utterances from a user to DTMF signals for transmission through a telecommunications network during a call, the method comprising the steps of:

activating a speech recognition circuit within the telephone while engaged in a call;

receiving a spoken utterance;

determining whether the spoken utterance corresponds to one of a predetermined set of DTMF commands;

generating a DTMF signal associated with the DTMF command when the spoken utterance is found to correspond to one of the DTMF commands;

transmitting the DTMF signal through the telecommunications network during the call;

repeating the steps of determining, generating, and transmitting; and deactivating the speech recognition circuit while engaged in a call.

8. The method of claim 7, wherein the step of activating the speech recognition circuit comprises pressing a push-button switch on the telephone.

9. The method of claim 8, further comprising the step of:
playing a first audible tone through a speaker of the telephone to alert the user that the telephone is ready for the receiving step following the pressing of the push button switch and prior to the receiving step.

10. The method of claim 9, further comprising the steps of:
playing a second audible tone to the user when the steps of receiving, determining, generating, and transmitting have been completed successfully; and
playing a third audible tone distinct from the first audible tone and the second audible tone to the user when the determining step does not find a correspondence.

11. The method of claim 10, wherein the second tone is at the same audible frequency as the first tone.

12. The method of claim 8, further comprising the step of:
when the determining step finds a correspondence, playing to the user through a speaker in the telephone a pre-stored speech waveform corresponding to the spoken utterance which allows the user to confirm that the determining step was performed correctly.

13. The method of claim 7, wherein the step of determining whether the spoken utterance corresponds to one of the DTMF commands is initiated by the prior recognition of a predetermined activation command.

14. The method of claim 13, further comprising the steps of:
playing a first audible tone to the user when the determining step finds a correspondence; and
playing a second audible tone distinct from the first audible tone to the user when the determining step does not find a correspondence.

15. The method of claim 7, wherein the determining step checks the correspondence of the spoken utterance to a predetermined set of words comprising "one," "two," "three," "four," "five," "six," "seven," "eight," "nine," "zero," "oh," "star," "asterisk," "pound," and "number."

16. The method of claim 7, wherein the spoken utterance is a word from a set comprising words representing the alphabetic letters "A" through "Z".

17. The method of claim 7, wherein the predetermined set of DTMF commands comprises the digits "0" through "9", the character "*", and the character "#".

18. The method of claim 7, wherein the step of deactivating the speech recognition circuit comprises deactivating the speech recognition circuit after a timer within the telephone measures a predetermined interval of silence, and wherein the steps of generating and transmitting are performed for each of the plurality of spoken utterances which corresponds to one of the predetermined DTMF commands.

* * * * *